United States Patent
Scheiff et al.

(10) Patent No.: US 12,486,587 B2
(45) Date of Patent: Dec. 2, 2025

(54) BLEND COMPOSITION COMPRISING PETROLEUM COKE AND PYROLYTIC CARBON FOR ELECTRODES

(71) Applicant: BASF SE, Ludwigshafen am Rhein (DE)

(72) Inventors: Frederik Scheiff, Ludwigshafen (DE); Marc Leduc, Ludwigshafen (DE); Andreas Bode, Ludwigshafen (DE); Sabine Eichhorn, Ludwigshafen (DE); William Daloz, Beachwood, OH (US); Julien Wyss, Granges (CH)

(73) Assignee: BASF SE, Ludwigshafen am Rhein (DE)

(*) Notice: Subject to any disclaimer, the term of this patent is extended or adjusted under 35 U.S.C. 154(b) by 890 days.

(21) Appl. No.: 17/250,390

(22) PCT Filed: Jul. 15, 2019

(86) PCT No.: PCT/EP2019/069029
§ 371 (c)(1),
(2) Date: Jan. 15, 2021

(87) PCT Pub. No.: WO2020/016186
PCT Pub. Date: Jan. 23, 2020

(65) Prior Publication Data
US 2021/0277526 A1    Sep. 9, 2021

(30) Foreign Application Priority Data
Jul. 19, 2018   (EP) .................... 18184459

(51) Int. Cl.
C25B 11/043   (2021.01)
C25B 1/00   (2021.01)
C25B 11/02   (2021.01)

(52) U.S. Cl.
CPC .............. *C25B 11/043* (2021.01); *C25B 1/00* (2013.01); *C25B 11/02* (2013.01)

(58) Field of Classification Search
CPC ......... C25B 1/00; C25B 11/02; C25B 11/043; C25C 3/12; C25C 3/125
See application file for complete search history.

(56) References Cited

U.S. PATENT DOCUMENTS 3,264,210 A * 8/1966 Waghorne ................. C01B 3/30
                                                    423/454
3,427,240 A * 2/1969 Landrum ................. C25C 3/125
                                                    252/502

(Continued)

FOREIGN PATENT DOCUMENTS

CN   102839393 A   12/2012
CN   106064814 A   11/2016

(Continued)

OTHER PUBLICATIONS

Kenneth K. Kuo, Ragini Acharya, "Appendix E: Particle Size-U.S. Sieve Size and Tyler Screen Mesh Equivalents", Fundamentals of Turbulent and Multiphase Combustion, 2012, John Wiley & Sons, Inc., pp. 795-797 (Year: 2012).*

(Continued)

*Primary Examiner* — Luan V Van
*Assistant Examiner* — Mofoluwaso S Jebutu
(74) *Attorney, Agent, or Firm* — Grüneberg and Myers PLLC

(57) ABSTRACT

A blend composition including a mixture of (i) petroleum coke in a content of 20 to 99 weight-%; and (ii) pyrolytic carbon in a content of 1 to 80 weight-%, in view of the total weight of the blend composition, wherein the blend composition contains at least two particle size fractions: (i) granular above 0.5 mm and (ii) fines below 0.5 mm, and wherein pyrolytic carbon is at least present in the granular (Continued)

size fraction, an electrode recipe, and the use of the electrode as an anode in a process of making aluminum.

21 Claims, 12 Drawing Sheets

(56) References Cited

U.S. PATENT DOCUMENTS

| | | | | |
|---|---|---|---|---|
| 3,488,409 | A * | 1/1970 | Beutler | G21C 3/626 |
| | | | | 264/0.5 |
| 3,978,177 | A | 8/1976 | Huschka et al. | |
| 4,013,760 | A * | 3/1977 | Huschka | C04B 35/532 |
| | | | | 376/427 |
| 5,299,745 | A * | 4/1994 | Fischer | C25C 3/125 |
| | | | | 241/24.15 |
| 6,350,520 | B1 * | 2/2002 | Nesbitt | H01G 11/34 |
| | | | | 428/408 |
| 2004/0253168 | A1 * | 12/2004 | Chu | H01M 4/587 |
| | | | | 422/600 |
| 2005/0279627 | A1 * | 12/2005 | Edwards | C25C 3/125 |
| | | | | 205/372 |
| 2007/0068800 | A1 * | 3/2007 | Edwards | C25C 3/125 |
| | | | | 204/280 |
| 2010/0014625 | A1 | 1/2010 | Hrovat et al. | |
| 2014/0127121 | A1 * | 5/2014 | Maass | C01B 32/05 |
| | | | | 423/445 R |
| 2019/0031961 | A1 * | 1/2019 | Öttinger | H05B 7/085 |

FOREIGN PATENT DOCUMENTS

| | | | |
|---|---|---|---|
| EA | 013899 B1 | 8/2010 | |
| EA | 014903 B1 | 2/2011 | |
| EP | 1766105 A2 | 3/2007 | |
| RU | 2539352 C1 | 1/2015 | |
| WO | WO 2006/007165 | 1/2006 | |
| WO | WO-2011096405 A1 * | 8/2011 | C01B 31/02 |

OTHER PUBLICATIONS

National Center for Biotechnology Information. "PubChem Compound Summary for , Carbon Black" PubChem, https://pubchem.ncbi.nlm.nih.gov/compound/Carbon-Black. Accessed Oct. 20, 2023. (Year: 2023).*
Kuroda Haruo, Akamatu Hideo. (1959) Studies on the Graphitization. III. The Sub-Structure of Heat-Treated Coke. Bulletin of the Chemical Society of Japan 32:7, 728-734. (Year: 1959).*
Hamaguchi et al. (WO 2011/096405 machine translation) (Year: 2011).*
Houston, Geoffrey James, The anodic evolution and dissolution of chlorine in melts containing aluminium chloride, 1977, Masters Thesis, UNSW (Year: 1977).*
Edwards, et al., "The production of electrode carbon from Australian fossil fuels", Institute of Fuel, Australian Membership Conference, vol. 13, 1974, pp. 13.1-13.21.
Edwards, et al., "Use of Shot Coke as an Anode Raw Material", Essential Readings in Light Metals, Jan. 2016, pp. 36-41.
European Search Report for EP Patent Application No. 18184459.8, Issued on Jan. 22, 2019, 3 pages.
Farr-Wharton, et al., "Chemical and electrochemical oxidation of heterogeneous carbon anodes", Electrochimica Acta, vol. 25, Issue 2, Feb. 1980, pp. 217-221.
Gardner, et al., "Production of electrode carbon from brown-coal char and gaseous hydrocarbons", Effective Use of Hydrocarbon Resources: Preprints of Papers, National Conference on Chemical Engineering, Adelaide, Aug. 25-26, 1976, pp. 80-85.
International Search Report for PCT Patent Application No. PCT/EP2019/069029, Issued on Oct. 7, 2019, 3 pages.
Qun et al., "Discussion on rational application of high sulfur petroleum coke in prebaked anode production", Light Metals, Issue 7, pp. 32-35, with English abstract.
Heinrich Predel, "Petroleum Coke", Ullman's Encyclopedia Industrial Chemistry, Sep. 23, 2014, pp. 1-21.
Josh Velson, Technoeconomics—Energy & Chemicals, Industrial Graphite Electrodes, Tech 2023S6, Jul. 2023, 157 pages.
Philipp Engels, et al., "Life cycle assessment of natural graphite production for lithium-ion battery anodes based on industrial primary data", Journal of Cleaner Production, 336, 130474, 2022, 14 pages.
Roland Geres, et al., Roadmap Chemie 2050 "Auf dem Weg zu enier treibhausgasneutralen chemischen Industrie in Deutschland", Dechema, Oct. 2019, 97 pages with English translation.

* cited by examiner

BLEND COMPOSITION COMPRISING PETROLEUM COKE AND PYROLYTIC CARBON FOR ELECTRODES

CROSS-REFERENCE TO RELATED APPLICATIONS

This application is the National Stage entry under § 371 of International Application No. PCT/EP2019/069029, filed on Jul. 15, 2019, and which claims the benefit of European Application No. 18184459.8, filed on Jul. 19, 2018. The content of each of these applications is hereby incorporated by reference in its entirety.

BACKGROUND OF THE INVENTION

Field of the Invention

The present invention relates to a blend composition comprising a mixture of petroleum coke and pyrolytic carbon; an electrode recipe and the use of this electrode as an anode in the process of producing aluminum.

Description of Related Art

The production of aluminum is carried out in electrolytic cells or pots (known as Hall-Héroult process). Electrolysis of Al2O3 occurs in a molten bath of cryolite layered between the carbon anodes and the molten metal. Aluminum ions within Al2O3 are reduced to form molten aluminum. The molten aluminum is collected at the bottom of the cell. The oxide ions react with the carbon anode producing carbon dioxide, thus, the carbon anode is consumed in the electrolytic reaction.

Carbon consumption during electrolysis requires prebaked anodes to be replaced every 3 to 4 weeks depending on anode size and current density. Anodes in various stages of consumption are present in all cells due to the restriction of constant replacement and minimal disruption to cells. At the time of anode changing, approximately three-quarters of the anode is consumed. The remainder is called butts.

Various reactions in the cell contribute to the consumption of the anode carbon. Those that do not result in metal reduction contribute to excess carbon consumption like airbum (O2+C→CO2, with O2 from ambient air), carboxy attack (CO2+C→CO, with CO2 as product of the Aluminum-producing redox reaction) and selective oxidation (dusting). Dusting occurs as a secondary effect of CO2 attack due to reactivity imbalance between the different coke phases allowing fragments of solid C to fall out.

The cost of carbon anode accounts for 15-20% of the total cost of aluminum electrolysis production. Hence, the quality of the carbon anode is of crucial importance and significantly influences the energy consumption and environmental effects of aluminum electrolysis. Anode quality is characterized by five main properties:

Reactivity, which determines the greater part of the excess carbon consumption per ton of aluminum produced. The lower the reactivity, the lower this excess carbon consumption.

Density, which is the main factor determining the lifetime of anodes in the pots. The greater the density, the longer the lifetime. Increasing anode lifetime decreases the number of anode changes that are necessary.

Thermal shock resistance, which determines whether or not cracking or fractures occur when anodes are placed in the pots, or during their cycles.

low electrical resistivity, which determines the electrical power loss due to the large electrical currents employed in the Hall cell high chemical purity, which determines the quality of the aluminum product due to the direct consumption of the anode in the electrolytic cell, any metallic or other impurities it contains tend to be transferred to the aluminum product and may adversely affect it mechanical properties. A high chemical purity has also a positive effect on the reactivity.

The raw material used for the production of the dry recipe in prebaked anodes plants are typically petroleum coke, coal tar pitch binder, crushed butts, green scrap (formed, but not baked anodes) and baked scrap (formed and baked anode, which are out of specification). Typically, prebaked anodes are made of about 65% coke, 15% pitch and 20% recycled anode butts.

In a paste plant the incoming calcined coke and the recycled material are crushed, screened/sized to predetermined fractions and added together to form a dry aggregate. The coke fractions used to make the anodes are typically characterized as coarse, intermediate and fines. The dry aggregate is preheated and mixed with binder, typically coal tar pitch, that has also been preheated to melt. The preheated mixture is pressed to the final shape, ensuring the compacted anode block maintains its structural form. The green compact is subsequently heated at an elevated temperature, e.g. about 1100° C., to form a baked anode before it is suitable for consumption in the electrolysis cell.

The continued increase of the demand for aluminum metal combined with the decrease and fluctuations in the quality of aluminum grade coke with both the density and the purity of the cokes affected makes it more challenging for the anode manufacturing plants to deliver steady quality anodes. The low quality grade coke has higher reactivity resulting in higher carbon consumption in the smelter.

Approximately 95% of the SO2 emissions generated by a smelter can be attributed to sulfur found in the incoming petroleum coke used in anode production. Thus, environmental regulations are aiming at reducing sulfur emissions, while the coke suppliers are offering higher sulfur material. The low sulfur coke material is becoming less available on the market and the price is steadily increasing. In addition, the sulfur level of many traditional "high sulfur" anode grade green cokes is increasing. Five years ago, a high sulfur anode grade green coke was regarded as one with a sulfur level of 3-4%. Today, a more typical level is 4-6%.

The difference in price between a barrel of low sulfur sweet crude oil and high sulfur sour crude, the "sweet-sour spread", is causing more refineries to process cheaper, higher sulfur crude oil. These higher sulfur crudes produce cokes with higher sulfur and metal impurity levels (particularly vanadium and nickel). Calciners are using more of these cokes to satisfy the increasing demand from the aluminum industry.

As the aluminum smelters have not changed coke sulfur specifications significantly due to the smelter environmental constraints the high coke sulfur levels must be offset by blending with lower sulfur cokes. As a result, the difference in sulfur level of cokes used in typical anode blends is increasing—where cokes with a sulfur level of 1-2% may be blended with cokes with sulfur levels up to 4-6% to achieve a smelter anode coke specification of 1.0-3.5%.

With the growth rates projected in primary aluminum production, the industry will have no other choice than using these higher sulfur blend cokes. The sulfur level of high sulfur cokes used in blends is increasing and will likely continue to increase.

Besides the environment regulations the sulfur content influences the quality of the anode strongly. High sulfur cokes undergo desulfurization during both calcining and anode baking. Desulfurization negatively affects coke properties such as real density is reduced and porosity is increased and additional desulfurization during anode baking can negatively affect anode properties such as increased both air and carboxy reactivity.

In addition, very low sulfur concentrations in the anode have been demonstrated to negatively impact anode quality and potentially Potroom performance by increasing the anode carboxy reactivity.

It has been shown that the anode reaction with CO2 can be a major contributor to carbon dust in electrolytic cells. Carbon dust at elevated quantities will increase pot temperature and ultimately reduce current efficiency and metal production. Many publications have shown that anode CO2 reactivity increases with increasing sodium concentrations.

It is also known, however that the catalytic behavior of sodium is counteracted by the presence of sulfur. It was shown that the reaction of sodium with sulfur inhibits the catalytic behavior of the sodium and reduces the tendency of the sodium to migrate during the baking process. Higher sulfur cokes and anodes will therefore have lower carboxy reactivities and less potential for dusting.

It was found that by segregating the low sulfur coke to the coarse fraction in the anode aggregate and subsequently increasing the high sulfur coke used in the fines fraction, the likelihood that the Sulphur can inhibit the effect of sodium has increased, thus reducing the overall anode CO2 reactivity. However, this decrease in anode carboxy reactivity could be at the expense of lower anode densities depending on the types of cokes used in the blends. For instance, if blending a low sulfur coke of low vibrated bulk density with a high sulfur coke with high vibrated bulk density, placing the higher density material into the ball mill circuit has the potential to decrease anode density.

In addition to the sulfur content, the fluctuations in the density of aluminum grade coke is increasing. There is the problem of attaining and maintaining high and consistent baked anode densities on the basis of calcined petroleum cokes from different sources or other solid carbon substitutes with changing materials properties. If facilities for coke blending are available and if different grades of coke can be procured, blending of coke is one possible way of optimizing the density of the dry aggregate. This, however, depends on the precedence given to the respective coke property. Up to now, the blending of high-porosity and low-porosity coke types is rarely given top priority. Commercial barriers, such as price and material shortage, also impose constraints on optimal blending.

In the last decades different attempts were made to blend or substitute petrolcokes with different carbon sources:

Edwards et al. attempted in 1969 to produce pyrolytic carbon suitable for anode manufacture by cracking natural gas and liquefied petroleum gas in a moving-burden reactor (Edwards, J. H., R. J. Tyler, and P. L. Waters. "The production of electrode carbon from Australian fossil fuels." Institute of Fuel, Australian Membership Conference, Adelaide, November, paper. Vol. 13. 1974). It was found that test electrodes prepared solely from the pyrolytic carbon by standard formulation techniques had unacceptable physical properties and test-cell performance. The major problem seemed to be that the pyrolytic carbon, because of its "onion" structure, did not bind well with the pitch and produced a very weak electrode. The low reactivity of the pyrolytic carbon relative to that of the pitch binder was also considered to be a potential problem in cell operation. In Gardner et al. is was assumed that an incorporation of 30-40% of pyrolytic carbon in the electrode aggregate would not affect the electrode performance negatively if the pyrolytic carbon would be used as the finer material in the range minus 100 mesh (0.15 mm) (Gardner, H. J., P. L. Waters, and A. Watts. "Production of electrode carbon from brown-coal char and gaseous hydrocarbons." Effective Use of Hydrocarbon Resources: Preprints of Papers, National Conference on Chemical Engineering, Adelaide, August 25-26, 1976, The. Institution of Engineers, Australia, 1976). This fraction is milled finer than the dimension of the onion-like layers. The onion-like structure, thus, disappears by milling.

Due to the availability and inexpensiveness of the brown-coal Gardener et al. disclosed the investigations into the use of brown-coal char as a substitute for petroleum coke in the manufacture of carbon for aluminum smelting by upgrading the brown coal. The brown-coal char is less dense and more reactive than petroleum coke. This could be improved by impregnating the char with pyrolytic carbon produced from petroleum gas. Unfortunately, the impregnated char gave higher carbon consumption than the petroleum coke due to increased mechanical loss and dusting resulting from differences between reactivity and rate of consumption of the impregnated char and the binder coke matrix.

EP 1766105 discloses a method of making a carbon electrode, suitable for use as an anode in an aluminum reduction cell, which comprises a mixed aggregate of particulate shot coke, a particulate carbonaceous material other than shot coke and a coal tar pitch or petroleum pitch or a combination of these pitches.

Farr-Wharton et al. disclosed in Electrochimica Acta, Vol. 25, pp. 217-221, Pergamon Press Ltd. 1980, that ordered carbons such as graphite and pyrolytic carbon have shown high resistance to chemical and electrochemical oxidation, but despite the oxidation resistance the consumption rate was high because of erosion.

The aluminum industry has avoided using highly isotropic cokes, cokes with a fine-grained texture which exhibit similar properties in all directions, particularly shot cokes, because they have high coefficients of thermal expansion (CTE) and low open porosity. Anodes made with these materials are more susceptible to thermal shock cracking during the rapid heat-up in aluminum electrolysis cells. They can also suffer from lower mechanical strength and dusting problems during cell operation. Shot cokes typically have low levels of open macro-porosity for pitch penetration. This reduces the ability of pitch to interlock and bond the structure together during carbonization.

Edwards et al. disclosed in Light Metals, p-36, 2009 (Edwards, Les, et al. "Use of shot coke as an anode raw material." Essential Readings in Light Metals. Springer, Cham, 2016. 36-41.) that the impact on anode coefficients of thermal expansion can be minimized by adding isotropic coke and shot coke to the fines fraction. This will however, result in increased air reactivity. It is suspected that when very isotropic cokes are added uniformly to all size fractions, most anode properties are impacted in some way in direct proportion to the levels added.

Due to environmental regulations, aluminum plants are utilizing low sulfur coke as a key lever in the strategy to reduce SO2 emissions. A negative impact of that action is an increase in CO2 reactivity of the anode. The following actions are suggested to take in the carbon plant to minimize the negative impact: (i) Increase anode baking soak time, (ii) Direct higher sulfur coke to the fines fraction (iii) Minimize the proportion of low sulfur coke in the aggregate blend by selecting cokes with very low sulfur.

Since the environment regulations are aiming at reducing sulfur emissions, while the coke suppliers are offering higher sulfur material, it is an ongoing task to find low sulfur blending material.

Additionally, benefits to anode performance and aluminum product are realized with minimization of other metal impurities, most importantly V and Ni, which are also present in traditional low grade petroleum cokes.

Blending in a fraction of higher density pyrolytic carbon can increase anode density, which increases lifetime by increasing mass of carbon available in the anode.

General, expanding backup reserves of resources for carbon anode is beneficial to the sustainable development of the aluminum industry.

Since the cost of producing carbon anodes is about 20% of the cost of producing aluminum metal in the Hall process, it is a general ongoing task to improve mechanical and chemical properties of the anode to minimize carbon consumption.

SUMMARY OF THE INVENTION

The present invention relates to a blend composition comprising a mixture of (i) petroleum coke in a content of 20 to 99 weight-% and (ii) pyrolytic carbon in a content of 1 to 80 weight-% in view of the total weight of the blend composition, whereas the blend composition contains as least two particle size fractions (i) granular above 0.5 mm and (ii) fines below 0.5 mm, whereas pyrolytic carbon is at least present in the granular size fraction.

DETAILED DESCRIPTION OF THE INVENTION

Figure 1A:
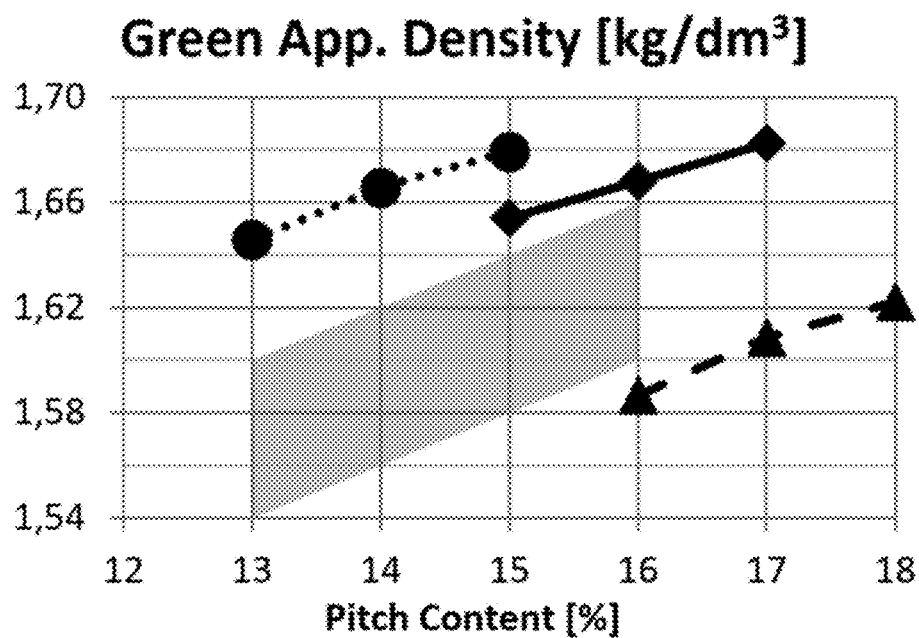
FIG. 1A shows a graph of the green apparent density of examples 1, 1C, and 2C.

The petroleum coke could be a mixture of different petroleum cokes. The pyrolytic carbon could be a mixture of different pyrolytic carbons.

Typically, the granular size fraction ranges from 0.5 to 16 mm, preferably 0.5 to 8 mm. Typically, the fines size fraction ranges from 0.005 to 0.5 mm.

The blend composition may also be named recipe or aggregate by the skilled person in the art.

The blend composition is preferably a dry (binder-free) blend composition.

Preferably, calcined petroleum coke (CPC) is used as petroleum coke (Predel, H. (2000). Petroleum coke. Ullmann's Encyclopedia of Industrial Chemistry). Preferably, the sulfur content of the petroleum coke is in the range of 0 to 10 weight-%, more preferably in the range of 0.5 to 8.5 weight-%, more preferably in the range of 1.5 to 7.0 weight % in view of the total weight of the petroleum coke. Petroleum coke is often abbreviated as petcoke.

The word "pyrolytic carbon" covers solid carbon produced from pyrolysis of light hydrocarbons in absence of oxygen (see for example Muradov, Nazim. "Low to near-zero CO2 production of hydrogen from fossil fuels: Status and perspectives." International Journal of Hydrogen Energy 42.20 (2017): 14058-14088). The preferred pyrolytic carbon for anode is a high density solid elemental carbon produced by deposition on carbon granules. This is preferred to thermal black produced by thermal/plasma processes or nanostructured carbon grown on metal/oxide catalysts.

The pyrolytic carbon can be produced by decomposition of and carbon deposition from gaseous hydrocarbon compounds on suitable underlying substrates (carbon materials, metals, ceramics and a mixture thereof) at temperatures ranging from 1000 to 2500 K and at pressures ranging from 0.5-5000 kPa (abs) (chemical vapour deposition or infiltration). The substrate can either be porous or non-porous and can be either be a support substrate in the reactor (a pre-installed part) or a granular and powderish material. The latter can either be realized as fixed bed, moving bed, fluidized bed or entrained flow. The production of pyrolytic carbon is not limited to a specific energy supply, fossil-fired, electrically heated or plasma-driven production reactors are possible.

A wide range of microstructures, e.g. isotropic, lamellar, substrate-nucleated and a varied content of remaining hydrogen, can occur in pyrolytic carbons, depending on the deposition conditions (temperature, type, concentration and flow rate of the source gas, surface area of the underlying substrate, etc.).

Typically, the density of the pyrolytic carbon is in the range of 1.6 to 2.3 g/cc, preferably 1.8 to 2.2 (real density in xylene, ISO 8004).

Typically, the impurities of the pyrolytic carbon are: S in the range of 0 to 1%, preferably 0 to 0.5%, more preferable 0 to 0.1%. Fe in the range of 0 to 1000 ppm, preferably 0 to 500 ppm, Ni in the range of 0 to 250 ppm, preferably 0 to 100 ppm, V in the range of 0 to 450 ppm, preferably 0 to 250 ppm, more preferable 0 to 100 ppm. Na in the range of 0 to 200 ppm, preferably 0 to 100 ppm.

Typically, the particle size of the pyrolytic carbon after pyrolysis has at least 5% by weight>1 mm, preferably 50% by weight>0.5 mm.

Typically, the crystal size (XRD) of the pyrolytic carbon is in the range of 20 to 60 Å, preferably 30 to 50 Å, (XRD, ISO 20203)

Typically, the porosity of the pyrolytic carbon granule is under 15%, preferably <10%, most preferably below 5% (Hg porosimetry, DIN66133).

Typically, the specific surface area of the pyrolytic carbon measured by Hg porosimetry (DIN66133) is in the range of 0.001 to 5 m2/g, preferably 0.01 to 2 m2/g.

Preferably the blend composition comprises a mixture whereas the content of petroleum coke is in the range of 30 to 98 weight-%, more preferably in the range 40 to 95 weight-%, more preferably in the range 50 to 95 weight-%, more preferably in the range 60 to 95 weight-%, more preferably in the range 70 to 95 weight-%, more preferably in the range 80 to 95 weight-%, more preferably in the range 85 to 95 weight-%, even more preferably in the range of 90 to 95 weight % in view of the total weight of the blend composition.

Preferably the blend composition comprises a mixture whereas the content of pyrolytic carbon is in the range of 2 to 70 weight-%, more preferably in the range 5 to 60 weight-%, more preferably in the range 5 to 50 weight-%, more preferably in the range 5 to 40 weight-%, more preferably in the range 5 to 30 weight-%, more preferably in the range 5 to 20 weight-%, more preferably in the range 5 to 15 weight-%, even more preferably in the range of 5 to 10 weight-% in view of the total weight of the blend composition.

In view of the total pyrolytic carbon: Preferably at least 30 weight-% of the total pyrolytic carbon of the blend composition is in the granular fraction, more preferably at least 40 weight-%, even more preferably at least 50 weight-%, more preferably at least 60 weight-%, more preferably at least 70 weight-%, more preferably at least 80 weight-%, more preferably at least 90 weight-%, even more preferably at least 95 weight-%, even more preferably all pyrolytic carbon is in the granular size fraction.

In view of the total pyrolytic carbon: Preferably 30 to 100 weight-% of the total pyrolytic carbon of the blend composition is in the granular fraction, more preferably 40 to 100 weight-%, even more preferably 50 to 100 weight-%, more preferably 60 to 100 weight-%, more preferably 70 to 100 weight-%, more preferably 80 to 100 weight-%, more preferably 90 to 100 weight-%, even more preferably 95 to 100 weight-%, even more preferably all pyrolytic carbon is in the granular size fraction.

In view of the total pyrolytic carbon: Preferably 70 to 0 weight-% of the total pyrolytic carbon of the blend composition is in the fine size fraction, more preferably 60 to 0 weight-%, even more preferably 50 to 0 weight-%, more preferably 40 to 0 weight-%, more preferably 30 to 0 weight %, more preferably 20 to 0 weight-%, more preferably 10 to 0 weight-%, even more preferably 5 to 0 weight-%, even more preferably none of the all pyrolytic carbon is in the fine size fraction.

Preferably 30 to 80 weight-%, more preferably 40 to 70 weight-%, even more preferably 50 to 65 weight-% of the particles have a granular particle size, and 20 to 70 weight-%, more preferably 30 to 60 weight-%, even more preferably 35 to 50 weight-% of the particles have a fine particle size.

Preferably, the blend composition contains as least three particle size fractions (i) coarse above 4 mm, (ii) intermediate between 4 and 0.5 mm and (iii) fines below 0.5 mm, whereas pyrolytic carbon is at least present in the intermediate and/or in the coarse fractions.

In view of the total pyrolytic carbon: Preferably at least 30 weight-% of the total pyrolytic carbon of the blend composition is in the intermediate size fraction, more preferably at least 40 weight %, even more preferably at least 50 weight-%, more preferably at least 60 weight-%, more preferably at least 70 weight-%, more preferably at least 80 weight-%, more preferably at least 90 weight-%, even more preferably at least 95 weight-%, even more preferably all pyrolytic carbon is in the intermediate size fraction.

In view of the total pyrolytic carbon: Preferably 30 to 100 weight-% of the total pyrolytic carbon of the blend composition is in the intermediate size fraction, more preferably 40 to 100 weight %, even more preferably 50 to 100 weight-%, more preferably 60 to 100 weight-%, more preferably 70 to 100 weight-%, more preferably 80 to 100 weight-%, more preferably 90 to 100 weight-%, even more preferably 95 to 100 weight-%, even more preferably all pyrolytic carbon is in the intermediate size fraction.

In view of the total pyrolytic carbon: Preferably 70 to 0 weight-% of the total pyrolytic carbon of the blend composition is in the fine and/or coarse size fraction, more preferably 60 to 0 weight %, even more preferably 50 to 0 weight-%, more preferably 40 to 0 weight-%, more preferably 30 to 0 weight-%, more preferably 20 to 0 weight-%, more preferably 10 to 0 weight-%, even more preferably 5 to 0 weight-%, even more preferably none of the all pyrolytic carbon is in the fine and/or coarse size fraction.

Preferably 30 to 80% by weight, more preferably 40 to 75%, even more preferably 50 to 75% of the particles have an intermediate and/or coarse particle size, and 20 to 70%, more preferably 25 to 60%, even more preferably 25 to 50% of the particles are fines.

Preferably 10 to 40%, more preferably 20 to 30% of the particles have a coarse particle size, 20 to 50%, more preferably 30 to 40% of the particles have an intermediate particle size and 25 to 55%, more preferably 30 to 50%, more preferably 35 to 45% of the particles are fines.

Depending on the anode production the anode producers use different fractions and sizing; typical values are summarized in the next table:

| 2 fraction | <0.5 mm | >0.5 mm | | | |
|---|---|---|---|---|---|
| 3 fraction | <.25 mm | .25-4 mm | >4 mm | | |
| 4 fraction | <.25 mm | .25-1 mm | 1-4 mm | >4 mm | |
| 5 fraction | <.25 mm | .25-1 mm | 1-2 mm | 2-4 mm | >4 mm |
| 6 fractions | .25 mm | .25-.5 mm | .5-1 mm | 1-2 mm | 2-4 mm | 4-8 mm |

The blend composition is preferably produced by mixing the pyrolytic carbon and the petroleum coke; preferably by mixing the dry pyrolytic carbon and the dry petroleum coke.

The blend composition could be mixed at the calciner factory, for example before or after the calcination of the petroleum coke, preferably after the calcination. Alternatively, the blend composition could be mixed before or after shipping at the respective harbors. Alternatively, the blend composition could be mixed at the anode production factory, either before crushing, screening and sizing the fractions or by adding the pyrolytic carbon directly in the already crushed, screened and sized aggregate of petroleum coke.

In addition, the present invention relates to an electrode recipe, preferably anode recipe, comprising a mixture of (i) blend composition of petroleum coke and pyrolytic carbon as described above, (ii) butts and/or scrap and (iii) binder material.

Typically, 35 to 95 weight-% of the total weight of the anode recipe is the blend composition, preferably 50 to 80 weight-%. Typically, 0 to 40 weight-% of the total weight of the anode recipe are the butts and/or scraps, preferably 15 to 30 weight-%. Typically, 5 to 25 weight-% of the total weight of the anode recipe is the binder, preferably 10 to 20 weight-%, even more preferably 13 to 18 weight-%.

The use of butts and scraps are known in the state of the art (Belitskus, David. "Effect of carbon recycle materials on properties of bench scale prebaked anodes for aluminum smelting." Metallurgical Transactions B 12.1 (1981): 135-139; Schmidt-Hatting, W., Kooijman, A. A., & Perruchoud, R. (2016). Investigation of the quality of recycled anode butts. In Essential Readings in Light Metals (pp. 251-266). Springer, Cham.; Schmidt-Hatting, Wolfgang, and A. Kooijman. "Optimization of the anode carbon consumption with respect to butt recycling." Light Metals 1993 (1993): 579-585).

All binders known in the literature can be used (Perruchoud, Raymond C., Markus W. Meier, and Werner K. Fischer. "Survey on worldwide prebaked anode quality." LIGHT METALS-WARRENDALE-PROCEEDINGS-. TMS, 2004). Preferably, coal tar pitch binder or a combination of pitch binder can be used as a binder.

Preferably the total sulfur content of the anode recipe is 0 to 5 weight-%, more preferably in the range 0.5 to 3.5 weight-%, more preferably in the range 1.0 to 2.5 weight %. Preferably, the blend composition ratio depends on the desired final sulfur content.

The blend composition and the butts and/or scraps are preferably preheated, preferably to a temperature (to melt the binder) of 100 and 175° C., and mixed with binder, typically coal tar pitch, that has preferably also been preheated to melt. The preheated anode recipe is preferably pressed to the final shape, ensuring the compacted anode block maintains its structural form. The green compact is preferably subsequently heated at an elevated temperature, for example 1000 to 1250° C., to form a baked anode. before it is suitable for consumption in the electrolysis cell.

The present invention includes a carbon anode, suitable for use as an anode in an aluminum reduction cell, which comprises a blend composition comprising a mixture of (i) petroleum coke in a content of 20 to 99 weight-% and (ii) pyrolytic carbon in a content of 1 to 80 weight-% in view of the total weight of the blend composition, whereas the blend composition contains at least two particle size fractions (i) granular above 0.5 mm and (ii) fines below 0.5 mm, whereas pyrolytic carbon is at least present in the granular size fraction.

Preferably, the carbon anode produced according to this invention provides one or more of the following performance properties, preferably all mentioned parameters: The green density is preferably at least as high as 1.50 g/cm3. Established ranges for CPC anodes are 1.54 to 1.66 g/cm3 (ISO 12985-1).

The baked density is preferably at least as high as 1.50 g/cm3 (ISO 12985-1). The established ranges for CPC anodes are 1.50 to 1.63 g/cm3 (ISO 12985-1).

The thermoshock and mechanical resistance is preferably higher than 6 MPa (ISO 12986-1), whereas 8-14 MPa are typical for CPC-based anodes.

The compressive strength is preferably higher than 25 MPa (ISO 18515).

The electric resistance is preferably below 80 µΩm. 50-60 µΩm is a typical industry range. The so-called air residue after test reaction with air is preferably higher than 65 wt.-%, more preferably higher than 85 wt.-%, in case of air reactivity (65-90 are typical, ISO 12989-1). The so-called CO2 residue after test reaction with CO2 is preferably higher than 80 wt.-%, more preferably higher than 90 wt.-% for the CO2 reactivity (where 80-95 are conventional, ISO 12988-1).

The present invention includes the use of the present carbon anode as anode in an aluminum reduction cell.

Any of the above, novel electrodes or electrodes made by the method of the present invention may be used in a method for producing aluminum by the molten salt electrolysis of aluminum oxide which comprises electrolyzing aluminum oxide dissolved in a molten salt at an elevated temperature by passing a direct current through an anode to a cathode disposed in said molten salt wherein said anode is any of the above electrodes.

Although there has been hereinabove described a specific electrode useful for molten salt electrolysis of aluminum oxide to aluminum in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention.

The results obtained on the blend-composition give a splendid demonstration on the potential of the blending approach.

The blending of low sulfur pyrolytic carbon reduces overall sulfur content in aluminum smelting anodes, while other parameters mentioned remain in the desired ranges for performance, and the blend exceeds the expected average of the individual blend components. This advantage is demonstrated in the examples.

The examples demonstrate that the weakness observed for the high sulfur coke is fully compensated by the pyrolytic carbon:

The pitch requirement and the baked apparent of the blend coke anodes are typical.

The air reactivity reaches a level that is appropriate for prebaked anodes.

The impurities Fe, Si, Ca and P lie within the typical ranges.

The S content is logically half the one observed for pure HS anodes and meets the stringent specifications (less than 1.5%) related to SO2 emissions.

The high Coefficient of Thermal Expansion (CTE) of the high sulfur coke is entirely compensated by the low one of the pyrolytic carbon In addition, the weaknesses for the pure pyrolytic carbon anodes are also eliminated: The electrical resistivity and mechanical characteristics of the blend anodes are normal. The $CO_2$ reactivity of the blended anodes is close to the typical range.

Thus, the invention provides reduced sulfur carbon electrodes having characteristics including density, air permeability, compressive strength, modulus of elasticity, thermal conductivity, coefficient of thermal conductivity, air reactivity, and carboxy-reactivity which are within acceptable ranges for aluminum smelters.

EXAMPLES

Parameters (see "Anode Manufacture, Raw Materials Formulation and Processing Parameters, Kristine L. Hulse, R&D Carbon, Page 10-14):
Green Density:

The green apparent density is measured from the geometrical dimensions and anode weight just after compaction (i.e. mass of green anode divided by calculated green anode volume). Variations in this parameter are an indication that there are raw material quality changes, process disturbances, particularly in the forming temperature and mixing conditions.
Baked Density:

The baked apparent density is measured from the baked anode mass divided by the calculated baked anode volume. A high baked density tends to reduce anode air permeability, its specific electric resistance and can extend anode life in the cells. Extremely high density can lead to thermal shock problems. Baked apparent density is controlled by (Sadler et al. 1995): raw material selection; aggregate granulometry; optimal pitch content; optimal processing to avoid poor compaction during forming (or expansion during baking).

Flexural Strength:

Flexural strength indicates the presence of micro cracks in the anode structure. Low flexural strength values usually indicate problems in the coke grain stability, forming conditions or high heat-up rates during baking (Fischer and Perruchoud 1992). This mechanical property is important during handling, setting and rodding of the anode block.
Compressive Strength:

Anode strength is mainly dependent on coke strength, pitch softening point and pitch content (Wilkening and Beilstein 1994). It is important that the anode has sufficient mechanical strength to withstand handling during processing and anode setting. There should be enough strength in the butts to enable the removal of bath from the used butts (Sadler et al. 1995).
Specific El. Resistance:

The specific electrical resistivity of the carbon anodes ideally should be as low as possible. This is to reduce energy losses associated with resistive heating in the anodes (Sadler et al. 1995). Resistivity is highly influenced by the basic coke structure, anode density and pore distribution. Invisible cracks, defects, and other flaws can be the result of mixing or pressing problems, excessive moisture in the paste, or thermal shock during baking or cooling. The presence of hairline cracks is observed through high standard deviation values (Fischer and Perruchoud 1987). Very low values of electrical resistivity and high thermal conductivity levels may be a result of over baking. This situation can cause airburn problems.
$CO_2$ Reactivity und Air Reactivity:

The reactivity values are important for determining the susceptibility of an anode to excess carbon consumption and dusting in the electrolysis cell. This is strongly influenced by the impurities present in the raw materials (Hume 1993) and baking parameters such as temperature and heat soaking time (Fischer et al. 1993).

The Invention

| Example | carbon | 8-4 mm Pyrolytic carbon/ residual coke [%] PC \| rest | 4-2 mm Pyrolytic carbon/ residual coke [%] PC \| rest | 2-1 mm Pyrolytic carbon/ residual coke [%] PC \| rest | 1-0.5 mm Pyrolytic carbon/ residual coke [%] PC \| rest | 0.5-0.25 mm Pyrolytic carbon/ residual coke [%] PC \| rest | <0.25 mm Pyrolytic carbon/ residual coke [%] PC \| rest |
|---|---|---|---|---|---|---|---|
| 1 | 35% Pyrolytic carbon, 15% CPC*, 50% HS coke | 7 \| 13 | 9 \| 17 | 4 \| 8 | 4 \| 8 | 10 \| 20 | |
| 2 | 25% Pyrolytic carbon, 25% CPC*, 50% Coke CHQ | 0 \| 14 | 7 \| 7 | 7 \| 7 | 7 \| 7 | 7 \|7 | 14 \| 16 |
| 3 | 7% Pyrolytic carbon, 43% CPC*, 50% Coke CHQ | 0 \| 14 | 2 \| 12 | 0 \| 14 | 0 \| 14 | 0 \| 14 | 0 \| 30 |
| 4 | 12.6 Pyrolytic carbon, 37.4% CPC*, 50% Coke CHQ | 0 \| 14 | 4 \| 10 | 0 \| 14 | 0 \| 14 | 0 \| 14 | 0 \| 30 |

-continued

| Example | carbon | 8-4 mm Pyrolytic carbon/ residual coke [%] PC \| rest | 4-2 mm Pyrolytic carbon/ residual coke [%] PC \| rest | 2-1 mm Pyrolytic carbon/ residual coke [%] PC \| rest | 1-0.5 mm Pyrolytic carbon/ residual coke [%] PC \| rest | 0.5-0.25 mm Pyrolytic carbon/ residual coke [%] PC \| rest | <0.25 mm Pyrolytic carbon/ residual coke [%] PC \| rest |
|---|---|---|---|---|---|---|---|
| 5 | 12.6 Pyrolytic carbon, 37.4% CPC*, 50% Coke CHQ | 0 \| 14 | 0 \| 14 | 4 \| 10 | 0 \| 14 | 0 \| 14 | 0 \| 30 |

*= used as carrier of the pyrolytic carbon

Comparative Examples

| Example | carbon | 8-4 mm Pyrolytic carbon/ residual coke [%] PC \| rest | 4-2 mm Pyrolytic carbon/ residual coke [%] PC \| rest | 2-1 mm Pyrolytic carbon/ residual coke [%] PC \| rest | 1-0.5 mm Pyrolytic carbon/ residual coke [%] PC \| rest | 0.5-0.25 mm Pyrolytic carbon/ residual coke [%] PC \| rest | <0.25 mm Pyrolytic carbon/ residual coke [%] PC \| rest |
|---|---|---|---|---|---|---|---|
| 1C | 70% pyrolytic, 30% CPC* | 14 \| 6 | 18 \| 8 | | 8 \| 4 | 8 \| 4 | 21 \| 9 |
| 2C | 100% HS coke | 0 \| 20 | 0 \| 26 | | 0 \| 12 | 0 \| 12 | 0 \| 30 |
| 3C | 100% Coke CHQ | 0 \| 14 | 0 \| 14 | 0 \| 14 | 0 \| 14 | 0 \| 14 | 0 \| 14 |

*= used as carrier of the pyrolytic carbon

Sulfur Content:

| Example | Sulfur [%] |
|---|---|
| 1 | 1.27 |
| 2 | 0.63 |
| 3 | 0.8 |
| 4 | 0.71 |
| 5 | 0.78 |
| 1C | 0.08 |
| 2C | 2.39 |
| 3C | 0.95 |

Carbon Sources:
Pyrolytic Carbon:

The pyrolytic carbon in example 1 was produced by decomposition of natural gas and deposition on CPC (having a particle size of 0.5-2.5 mm, a sulfur content of 1.1 wt.-% and a real density in xylene of 2.09 g/cm3) in a fluidized bed at temperatures from 1100-1300° C. and at pressures from 1-2 bar(abs).

The pyrolytic carbon from example 2-5 was produced in a fixed bed reactor at 1200° C. at 1.0-1.2 bar(abs) by decomposition of methane and by deposition on a CPC (this type had a particle size of 1-4 mm, a sulfur content of 0.95 wt.-% and a similar real density in xylene).

HS Coke:

The HS coke is a typical calcined petroleum coke with a sulfur content of 3.1 wt.-%, impurity levels of 400 ppm V, 800 ppm Si, 700 ppm Fe, 500 ppm Ca and a real density in xylene of 2.07 g/cm3, a total porosity of 25.7% (DIN66133), This material is available by standard CPC suppliers and traders.

Coke C HQ:

This coke is used as "high quality" reference CPC and is characterized by a sulfur content of 0.95 wt.-%, impurity levels of 30 ppm V, 10 ppm Si, 80 ppm Fe, 20 ppm Ca and a real density of 2.08 g/cm3. The total porosity is 20%.

CPC:

The material referred as CPC indicates the substrate for the pyrolytic carbon of example 2-5, which is the coke with 1.1 wt.-% S and a real density in xylene of 2.09 g/cm3. Impurity levels amount to 180 ppm V, 100 ppm Si, 90 ppm Fe, 50 ppm Ca. The total porosity is 23%.

Pitch:
Material:

The binder used in the examples was a coal tar pitch a typical Mettler softening point (ISO 5940-2) of 113° C. The other important characteristics of the pitch were the quinoline insoluble (ISO 6791) 8.4% toluene insoluble (ISO 6376) 28% and a real density in helium (ISO 21687) of 1.31 g/cm3.

Pitch Content:

| Example | pitch |
|---|---|
| 1 | 15-17% |
| 2 | 14-17% |
| 3 | 14-15% |
| 4 | 14-15% |

-continued

| Example | pitch |
|---------|-------|
| 5  | 14-15% |
| 1C | 13-15% |
| 2C | 16-18% |
| 3C | 12-18% |

Production of Anodes 1-5, 1C, 2C, 3C:

The anodes were produced in a multi-step procedure. The first step was the sieving of the pyrolytic carbon and CPC raw materials to fractions of 8-4 mm, 4-1 mm, 1-0.5 mm and 0.5-0.25 mm. The second step was the generation of fines (fraction<0.25 mm) in the desired quantity. The fraction 8-4 mm was made of pre-baked scrap with the respective ratio of pyrolytic carbon and petroleum coke. The recipe-specific amounts of pyrolytic carbon and/or HS CPC or Coke HQ for each fraction were mixed together to obtain the so-called dry-aggregate. This dry aggregate was then heated above softening point of the coal tar pitch (113° C.) and mixed with the coal tar pitch binder. The pastelike mixture was transferred to a hydraulic press and formed to the so-called green anode at pressures Z 400 bar. The green anodes were subsequently baked at temperatures of 1100° C. After baking, sticking material was removed from the anode block and the anode cleaned. At least three different pitch amounts were tested for each dry aggregate recipe and for each of those pitch concentrations three test anodes blocks were manufactured and tested.

1. Measurement to Example 1, 1C, 2C

Figure 1B:
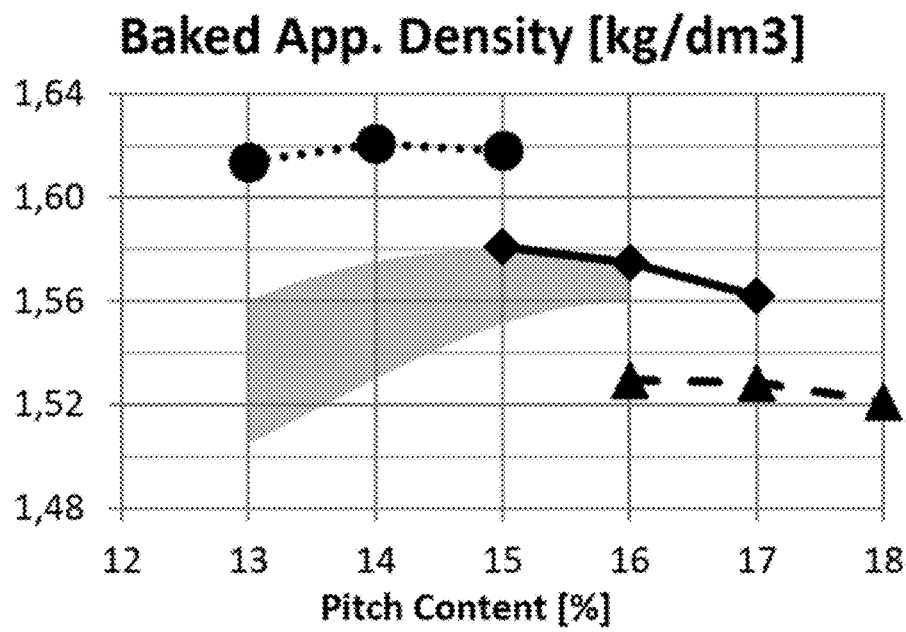
FIG. 1B shows a graph of the baked apparent density of examples 1, 1C, and 2C.
Figure 2:
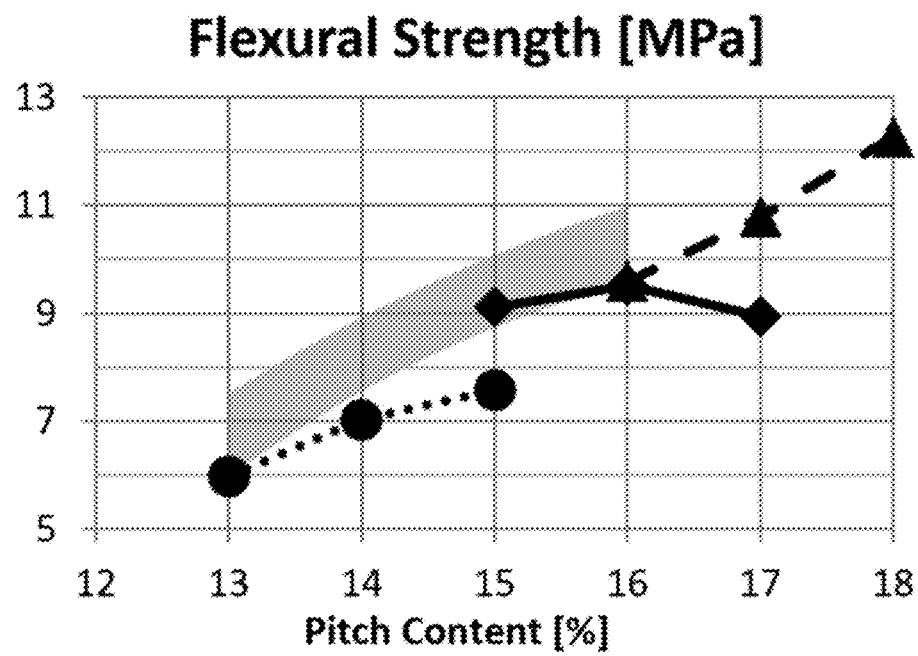
FIG. 2 shows a graph of the flexural strength of examples 1, 1C, and 2C.
Figure 3:
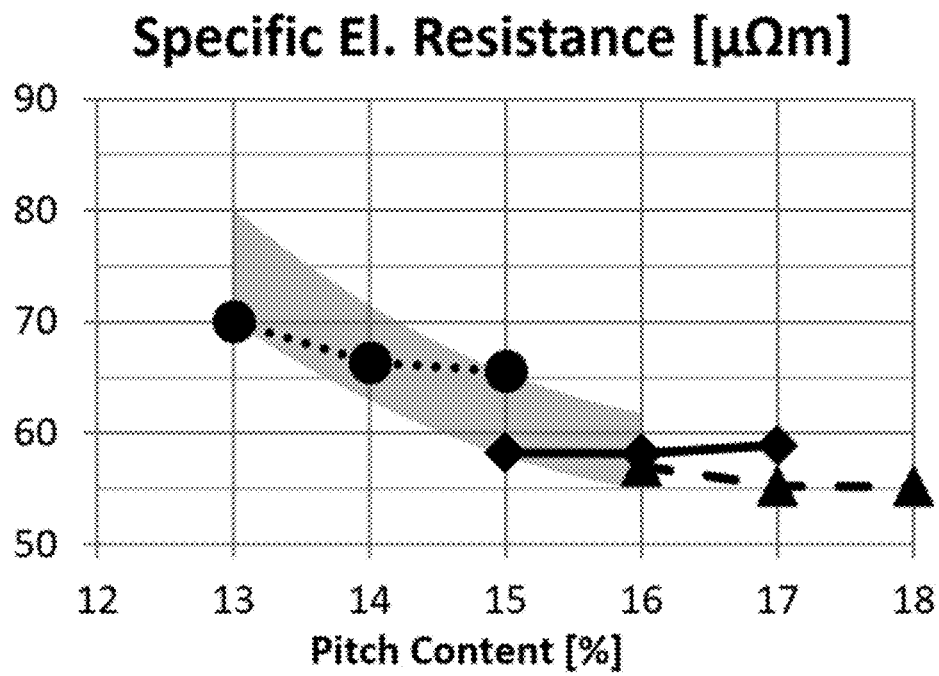
FIG. 3 shows a graph of the specific electrical resistance of examples 1, 1C, and 2C.
Figure 4A:
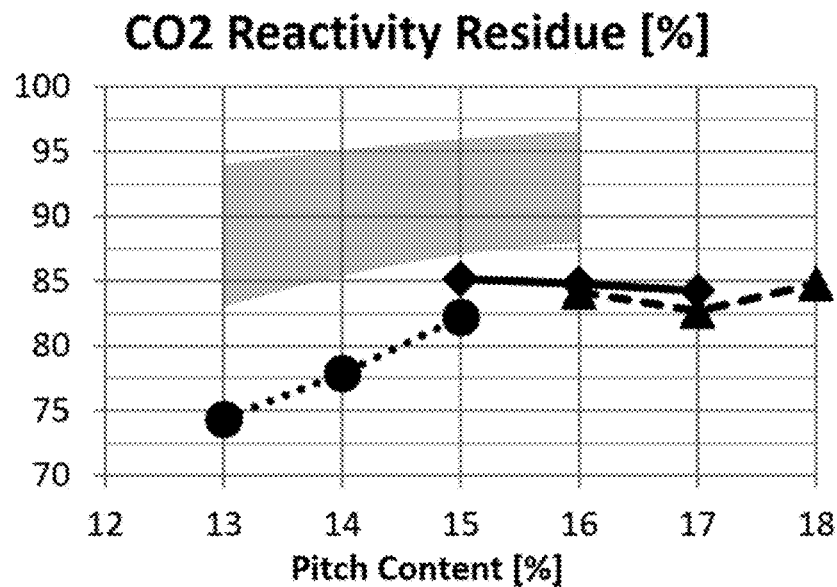
FIG. 4A shows a graph of the $CO_2$ reactivity residue of examples 1, 1C, and 2C.
Figure 4B:
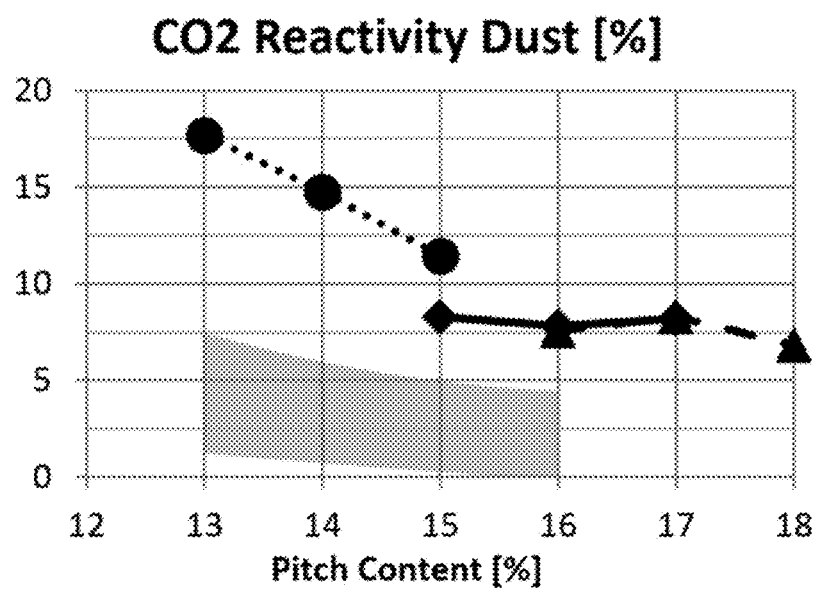
FIG. 4B shows a graph of the $CO_2$ reactivity dust of examples 1, 1C, and 2C.
Figure 4C:
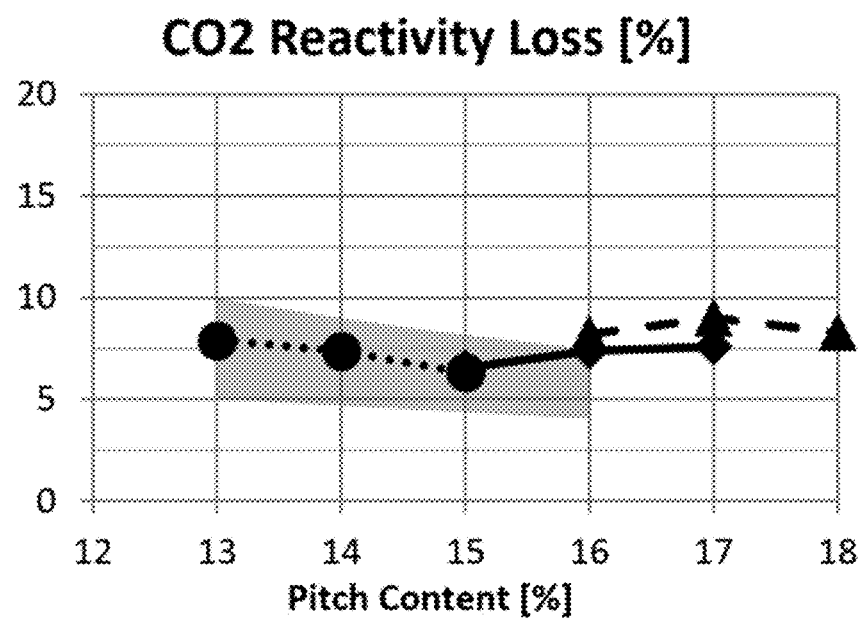
FIG. 4C shows a graph of the $CO_2$ reactivity loss of examples 1, 1C, and 2C.
Figure 5A:
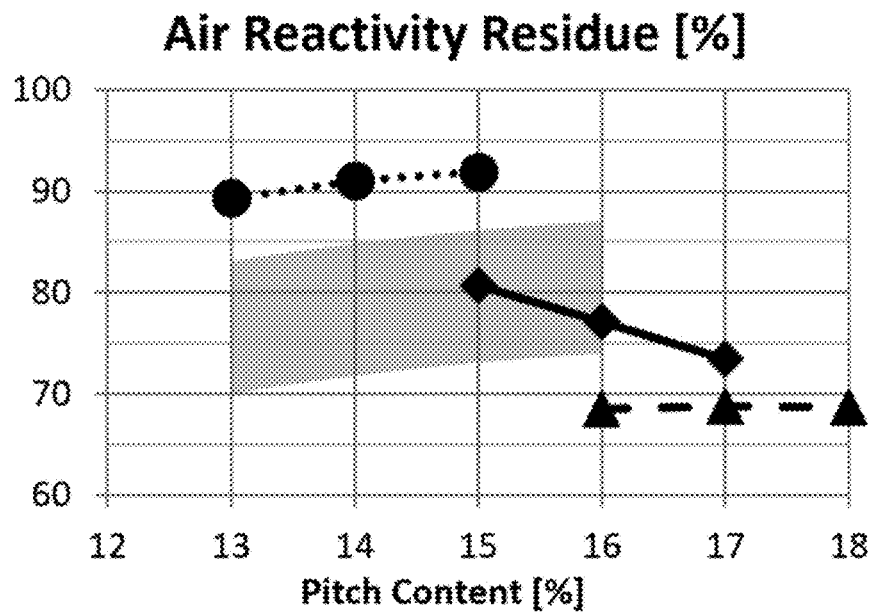
FIG. 5A shows a graph of the air reactivity residue of examples 1, 1C, and 2C.
Figure 5B:
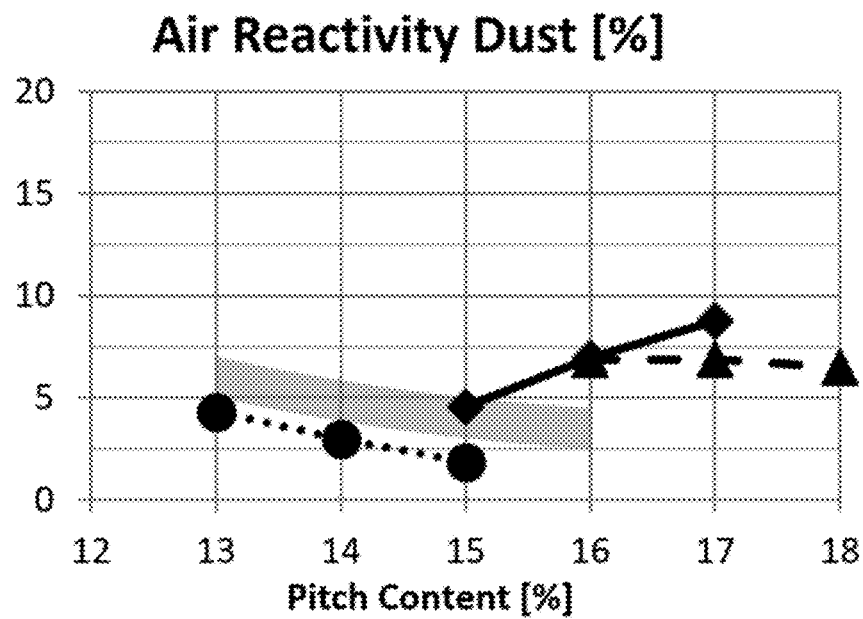
FIG. 5B shows a graph of the air reactivity dust of examples 1, 1C, and 2C.
Figure 5C:
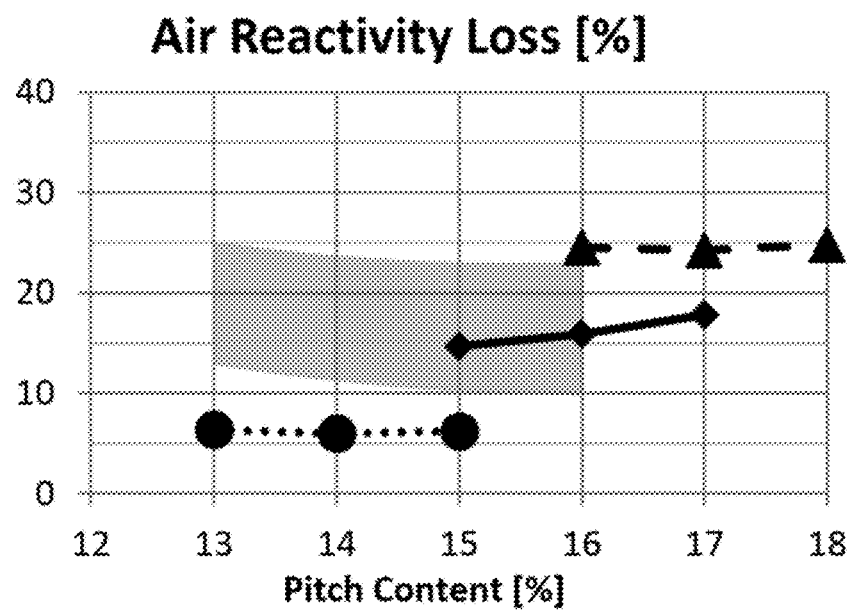
FIG. 5C shows a graph of the air reactivity loss of examples 1, 1C, and 2C.
Figure 6A:
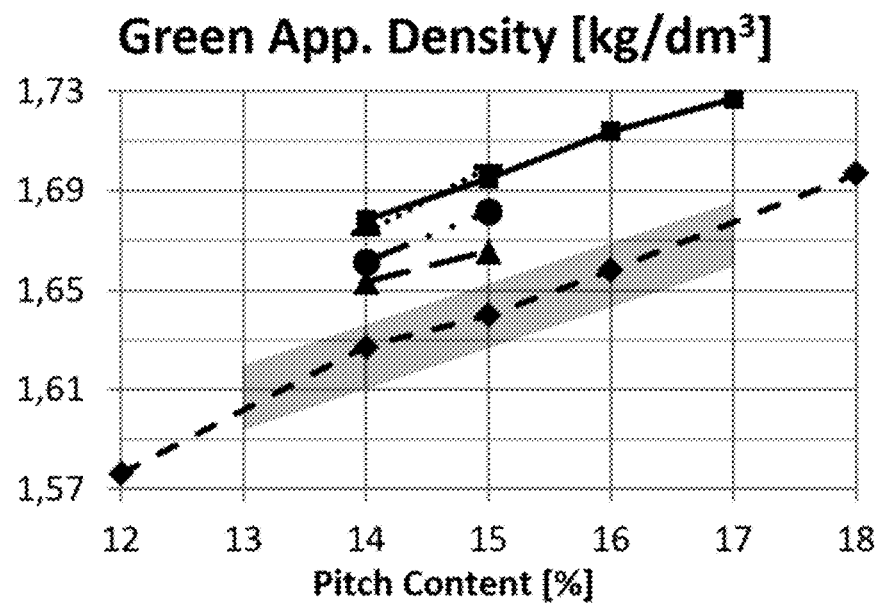
FIG. 6A shows a graph of the green apparent density of examples 2-5 and 3C.
Figure 6B:
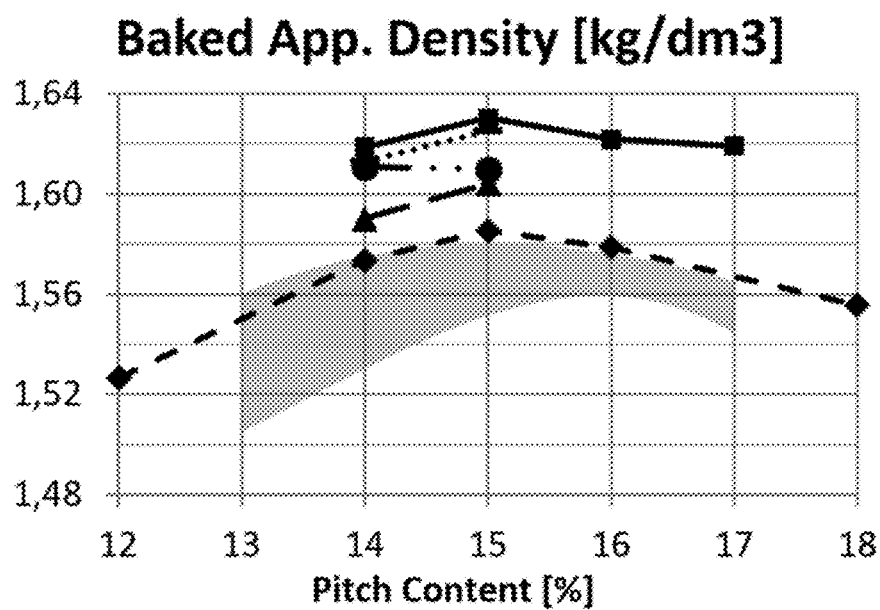
FIG. 6B shows a graph of the baked apparent density of examples 2-5 and 3C.
Figure 7:
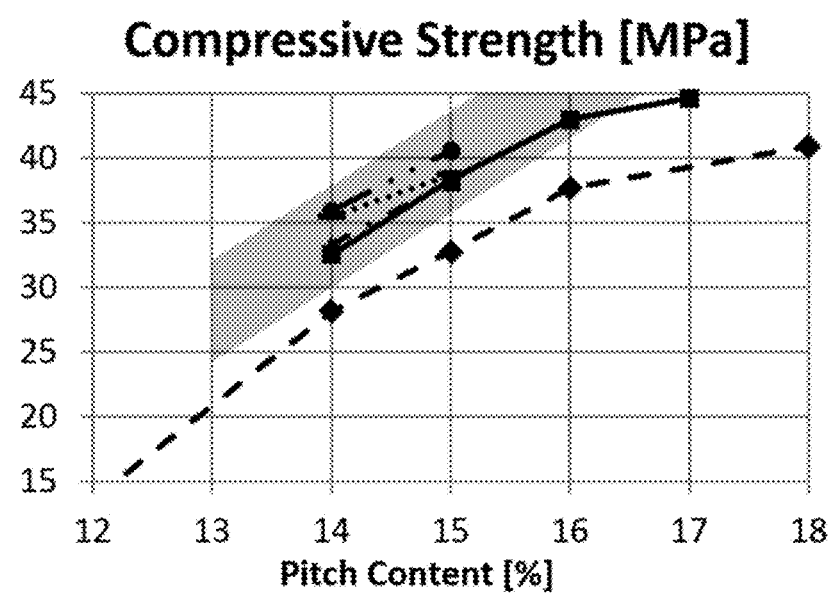
FIG. 7 shows a graph of the compressive strength of examples 2-5 and 3C.
Figure 8:
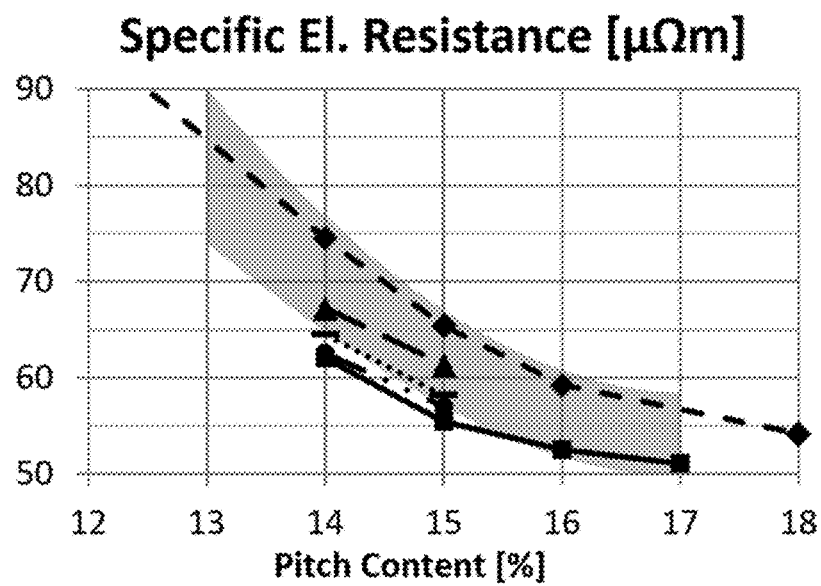
FIG. 8 shows a graph of the specific electrical resistance of examples 2-5 and 3C.
Figure 9A:
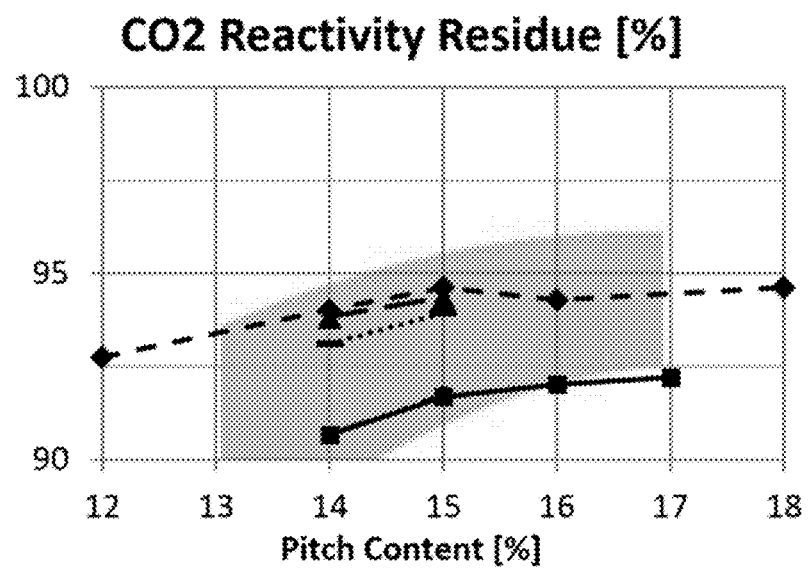
FIG. 9A shows a graph of the $CO_2$ reactivity residue of examples 2-5 and 3C.
Figure 9B:
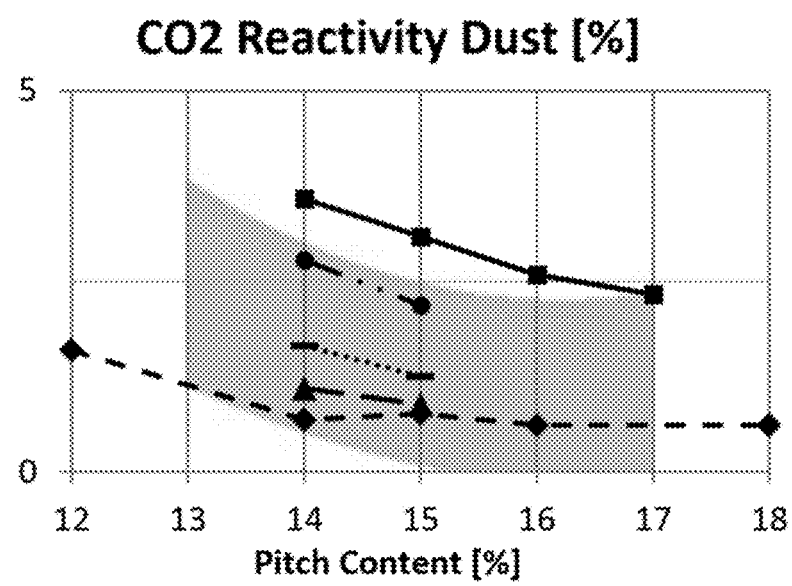
FIG. 9B shows a graph of the $CO_2$ reactivity dust of examples 2-5 and 3C.
Figure 9C:
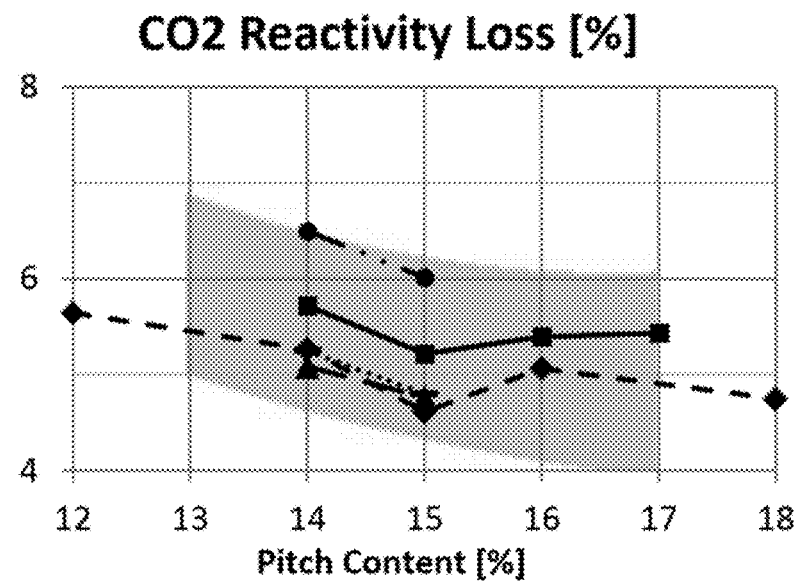
FIG. 9C shows a graph of the $CO_2$ reactivity loss of examples 2-5 and 3C.
Figure 10A:
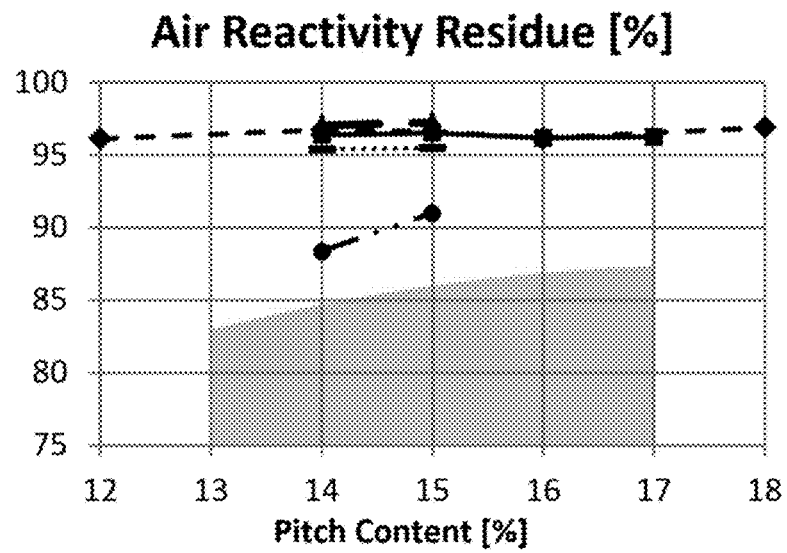
FIG. 10A shows a graph of the air reactivity residue of examples 2-5 and 3C.
Figure 10B:
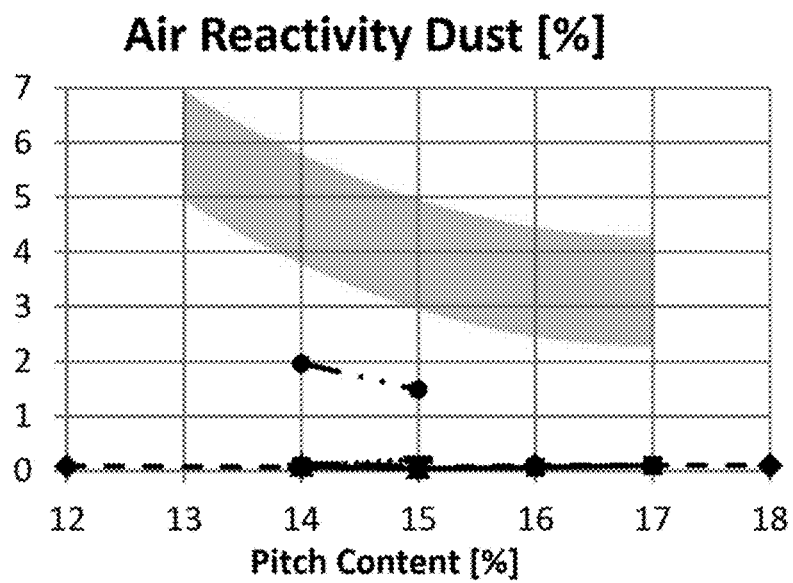
FIG. 10B shows a graph of the air reactivity dust of examples 2-5 and 3C.
Figure 10C:
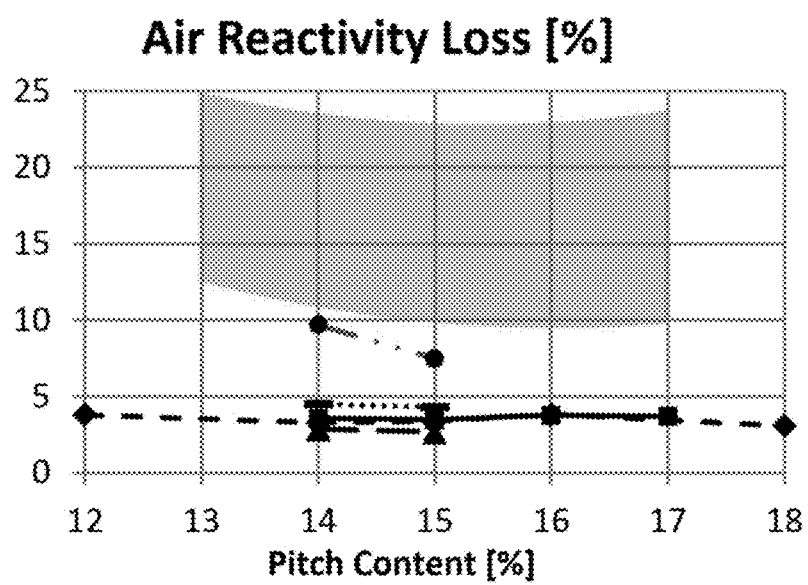
FIG. 10C shows a graph of the air reactivity loss of examples 2-5 and 3C.

Comments to the FIGS. 1A to 10C:

The grey zones in the graphics show the typical values for pilot anodes used in the Al industry. All data points represent an average of three individual anodes tested.

The following symbols are used to discriminate between the examples in the figures:
- ━◆━ MIX 50/50%
- ··●·· Pyro-C
- ━▲━ HS CPC 1.1 Density (FIGS. 1A-1B):

The density should be high to increase the weight of carbon delivered to the electrolysis.

Conclusion

The green and baked density of the anodes in example 1 are well in the desired high range. Surprisingly, the density of the 50/50 blend composition is not a linear interpolation between the high density pyrolytic carbon and the low-density HS coke. Instead, the mixture density is shifted toward the desired higher densities.

1.2 Strength (FIG. 2):

The strength should be high to improve the thermal shock resistance.

Conclusion

The strength of the 50/50 mix in example 1 is also a nonlinear average of example 1C and 2C, as a skilled person in art would expect. This surprising finding is of high relevance for the blend approach according to this invention, as an anode completely made of pyrolytic carbon (example 1C) fails due to the insufficient mechanical strength.

1.3 Electrical Resistance (FIG. 3):

The specific electrical resistance should be low to reduce the electrical consumption in the electrolysis cell.

Conclusion

The specific electrical resistance in example 1C is not a linear average of examples 1C and 2C. Again, it is shifted towards the more desired direction of low electrical resistance, which reduces the energy consumption in the electrolytic cell.

1.4 $CO_2$ Reactivity (FIGS. 4A-4C):

$CO_2$ Reactivity Residue:

The $CO_2$ Reactivity Residue should be high to reduce the quantity of carbon that reacts with $CO_2$.

$CO_2$ Reactivity Dust:

The $CO_2$ Reactivity Dust should be low to avoid carbon particles falling into the bath which will increase the resistivity.

$CO_2$ Reactivity Loss:

The $CO_2$ Reactivity Loss should be low to reduce the quantity of carbon that reacts with $CO_2$ Conclusion Surprisingly, the anode made of the less contaminated pyrolytic carbon (example 1C) has a higher reactivity towards $CO_2$. This results from higher degree of dusting. Dusting is in this case induced by a selective reaction of the binder matrix due to a reactivity mismatch between uncontaminated pyro-C granular structure and a contaminated, more reactive matrix. However, it is surprising that the 50/50 mixture compensates for this reactivity mismatch although some reactivity mismatch remains—between the contaminated HS coke particles, pitch matrix and relatively pure pyrolytic carbon particles.

1.5 Air Reactivity (FIGS. 5A-5C):

Air Reactivity Residue:

The Air Reactivity Residue should be high to reduce the quantity of carbon that reacts with air.

Air Reactivity Dust:

The Air Reactivity Dust should be low to avoid carbon particles falling into the bath which will increase the resistivity.

Air Reactivity Loss:

The Air Reactivity Loss should be low to reduce the quantity of carbon that reacts with Air.

Conclusion

The air reactivity of the blend anode (example 1) is well in the required range and fully compensates the high reactivity of the HS coke (example 2C).

1.6 Impurities:

|    | S     | V       | Si      | Ni      | Fe      | Na      | P     | Ca      |
|----|-------|---------|---------|---------|---------|---------|-------|---------|
| 1  | 1.27% | 189 ppm | 267 ppm | 96 ppm  | 348 ppm | 108 ppm | 8 ppm | 178 ppm |
| 1C | 0.09% | 33 ppm  | 56 ppm  | 23 ppm  | 97 ppm  | 118 ppm | 4 ppm | 41 ppm  |
| 2C | 2.39% | 339 ppm | 516 ppm | 161 ppm | 588 ppm | 101 ppm | 12 ppm| 320 ppm |

Conclusion:

The impurities only depend on the blend ratio and are a linear average of both materials, i.e. example 1 represents the average of example 1C and 2C, as a person skilled in art would expect. However, it is worth emphasizing that this invention provides a solution for the sulfur emission issue and also reduces the relevant contaminations. The sulfur concentration in example 1 and also the other impurities are well in line with governmental emission restrictions and industry specifications. The surprising aspect is that two materials which are that different in composition can be used in a blend together as anode raw material.

2. Example 2-5, 3C

Comments:

The grey zones in the graphics show the typical values for pilot anodes used in the Al industry. All data points represent an average of three individual anodes tested.

The following symbols are used to discriminate between the examples in the figures:
- – ♦ – 100% C3000
- –■– 50% Pyro-C
- –▲– 4-2 mm Pyro-C 50%
- ········ 4-2 mm Pyro-C 90%
- –●· 2-1 mm Pyro-C/New CPC 2.1 Density (FIGS. 6A-6B):

The density should be high to increase the weight of carbon delivered to the electrolysis.

Conclusion

The example 2-5 show in comparison to 3C that the targeted high density can be achieved with high fraction of pyrolytic carbon in the anode. Surprisingly, the density is even above the average industry range, indicating a performance advantage of the blend compared to the standard CPC anode.

2.2 Strength (FIG. 7):

The strength should be high to improve the thermal shock resistance.

Conclusion

In case of the compressive strength, one would expect a reduction upon blending with pyrolytic carbon. This is due to the laminated structure and the resulting high anisotropy of the pyrolytic carbon. However, the strength remains in an acceptable level, which was not expected according to state of the art attempts of using pyrolytic carbon in electrodes.

2.3 Electrical Resistance (FIG. 8):

The specific electrical resistance should be low to reduce the electrical consumption in the electrolysis cell.

Conclusion

The pyrolytic carbon has a low electrical resistance. Thus, the anode performance scales with the amount of pyrolytic carbon in the blend.

2.4 CO2 Reactivity (FIGS. 9A-9C):

CO2 Reactivity Residue:

The CO2 Reactivity Residue should be high to reduce the quantity of carbon that reacts with CO2.

CO2 Reactivity Dust:

The CO2 Reactivity Dust should be low to avoid carbon particles falling into the bath which will increase the resistivity.

CO2 Reactivity Loss:

The CO2 Reactivity Loss should be low to reduce the quantity of carbon that reacts with CO2.

Conclusion

The CO2 reactivity in examples 2-5 is again higher than in the reference example 3C due to the higher dusting, created by the reactivity mismatch, but it is still in the typical range for anodes.

2.5 Air Reactivity (FIGS. 10A-10C):

Air Reactivity Residue:

The Air Reactivity Residue should be high to reduce the quantity of carbon that reacts with air.

Air Reactivity Dust:

The Air Reactivity Dust should be low to avoid carbon particles falling into the bath which will increase the resistivity.

Air Reactivity Loss:

The Air Reactivity Loss should be low to reduce the quantity of carbon that reacts with Air.

Conclusion

The air reactivity is again not significantly affected by blending in pyrolytic carbon into HQ coke.

2.6 Impurities:

|    | S     | V      | Si     | Ni     | Fe      | Na      | P     | Ca     |
|----|-------|--------|--------|--------|---------|---------|-------|--------|
| 2  | 0.64% | 28 ppm | 39 ppm | 71 ppm | 178 ppm | 56 ppm  | 7 ppm | 25 ppm |
| 3  | 0.8%  | 29 ppm | 29 ppm | 81 ppm | 117 ppm | 53 ppm  | 4 ppm | 25 ppm |
| 4  | 0.75% | 35 ppm | 42 ppm | 81 ppm | 130 ppm | 66 ppm  | 5 ppm | 30 ppm |
| 5  | 0.78% | 31 ppm | 34 ppm | 88 ppm | 159 ppm | 113 ppm | 4 ppm | 31 ppm |
| 3C | 0.86% | 28 ppm | 31 ppm | 86 ppm | 128 ppm | 59 ppm  | 3 ppm | 30 ppm |

Conclusion

The impurities are again in line with a simple mixing rule.

The invention claimed is:
1. An electrode blend composition, comprising:
a mixture of
(i) petroleum coke in a content of 20 to 99 weight-%; and
(ii) pyrolytic carbon in a content of 1 to 80 weight-%, in view of the total weight of the blend composition,
wherein the blend composition contains at least two particle size fractions:
(i) granular above 0.5 mm and (ii) fines below 0.5 mm,
wherein pyrolytic carbon is at least present in the granular size fraction,
wherein said pyrolytic carbon is produced by decomposition of gaseous hydrocarbon compounds at a temperature of 1000 to 2500K and by deposition of said pyrolytic carbon on carbon granules,
wherein said pyrolytic carbon has a crystal size in the range of 20 to 60 Å,
wherein said pyrolytic carbon is present in the granular size fraction having a particle size of 4-2 mm and/or 8-4 mm, and
wherein at least 50 weight-% of the total pyrolytic carbon of the blend composition is in the granular fraction.
2. The blend composition of claim 1, wherein the content of said petroleum coke is of 70 to 95 weight-% and the content of said pyrolytic carbon is of 5 to 30 weight-%, in view of the total weight of the blend composition.
3. The blend composition of claim 1, wherein at least 70 weight-% of the total pyrolytic carbon of the blend composition is in the granular fraction.
4. The blend composition of claim 1, wherein said blend composition contains at least three particle size fractions:
(i) coarse above 4 mm, (ii) intermediate between 4 and 0.5 mm, wherein the coarse and intermediate fractions comprise said granular size fraction, and (iii) said fines below 0.5 mm, and
wherein pyrolytic carbon, which has a size between 4 and 0.5 mm, is at least present in the intermediate fraction and/or pyrolytic carbon which has a size above 4 mm is present in the coarse fraction.
5. The blend composition of claim 4, wherein at least 30 weight-% of the total pyrolytic carbon of the blend composition is in the intermediate size fraction.
6. The blend composition of claim 4, wherein 40 to 100 weight-% of the total pyrolytic carbon of the blend composition is in the intermediate size fraction, 40 to 0 weight-% is in the coarse size fraction, and 20 to 0 weight-% is in the fine fraction.
7. The blend composition of claim 1, wherein a density of said pyrolytic carbon is in the range of 1.8 to 2.2 g/cc.
8. The blend composition of claim 1, wherein the crystal size of said pyrolytic carbon is in the range of 30 to 50 Å.
9. The blend composition of claim 1, wherein the petroleum coke comprises calcined petroleum coke, and wherein a sulfur content is in the range 1.5 to 7.0 weight %, in view of a total weight of the petroleum coke.
10. The blend composition of claim 1, wherein the specific surface area of the pyrolytic carbon is in the range of 0.001 to 5 m$^2$/g.
11. The blend composition of claim 1, wherein the porosity of the pyrolytic carbon is under 15%.
12. The blend composition of claim 1, wherein the content of said petroleum coke is 40 to 98 weight-% and the content of said pyrolytic carbon is 2 to 60 weight-%.
13. The blend composition of claim 1, wherein 90 to 100 weight-% of the total pyrolytic carbon of the electrode composition is in the granular fraction.
14. The blend composition of claim 1, wherein said pyrolytic carbon is produced by decomposition of natural gas at a temperature of 1100 to 1300° C.
15. A method of making the blend composition of claim 1, the method comprising:
mixing the pyrolytic carbon and the petroleum coke.
16. An electrode recipe, comprising:
a mixture of (i) the blend composition of petroleum coke and pyrolytic carbon according to claim 1, (ii) butts and/or scrap, and (iii) a binder material.
17. The electrode recipe of claim 16, wherein 35 to 95 weight-% of the total weight of the electrode recipe is the blend composition, 0 to 40 weight % of the total weight of the electrode recipe are the butts and/or scraps, and 5 to 25 weight-% of the total weight of the electrode recipe is the binder material.
18. A method of making the electrode recipe of claim 1, the method comprising:
preheating said blend composition and the butts and/or scraps, and mixing said preheated mixture with a binder.
19. A method of making a carbon electrode, suitable as an anode in an aluminum reduction cell, the method comprising:
mixing the blend composition according to claim 1 with butts and/or scrap and a binder material at an elevated temperature to form a paste, and
baking said solid body at an elevated temperature to form the carbon electrode.
20. A carbon electrode, suitable as an anode in an aluminum reduction cell, which comprises a blend composition comprising a mixture of (i) petroleum coke in a content of 20 to 99 weight-% and (ii) pyrolytic carbon in a content of 1 to 80 weight-%, in view of the total weight of the blend composition,
wherein the blend composition contains at least two particle size fractions:
(i) granular above 0.5 mm and (ii) fines below 0.5 mm, and
wherein pyrolytic carbon is at least present in the granular size fraction,
wherein said pyrolytic carbon is produced by decomposition of gaseous hydrocarbon compounds at a temperature of 1000 to 2500K and by deposition of said pyrolytic carbon on carbon granules,
wherein said pyrolytic carbon has a crystal size in the range of 20 to 60 k,
wherein said pyrolytic carbon is present in the granular size fraction having a particle size of 4-2 mm and/or 8-4 mm, and
wherein at least 50 weight-% of the total pyrolytic carbon of the blend composition is in the granular fraction.
21. A method of making aluminum, comprising:
electrolyzing aluminum oxide in an aluminum reduction cell comprising the carbon electrode according to claim 20 as a carbon anode.

* * * * *